US008685902B2

(12) United States Patent
Pershikova et al.

(10) Patent No.: US 8,685,902 B2
(45) Date of Patent: *Apr. 1, 2014

(54) PROPPANT, PROPPANT PRODUCTION METHOD AND USE OF PROPPANT

(75) Inventors: Elena Mikhailovna Pershikova, Moscow (RU); Eamonn O'Neill, Croissy sur Seine (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 88 days.

This patent is subject to a terminal disclaimer.

(21) Appl. No.: 12/517,123

(22) PCT Filed: Nov. 30, 2007

(86) PCT No.: PCT/RU2007/000672
§ 371 (c)(1),
(2), (4) Date: Dec. 17, 2009

(87) PCT Pub. No.: WO2008/094069
PCT Pub. Date: Aug. 7, 2008

(65) Prior Publication Data
US 2010/0105579 A1    Apr. 29, 2010

(30) Foreign Application Priority Data

Dec. 27, 2006  (RU) ............................... 2006146362

(51) Int. Cl.
C09K 8/74 (2006.01)
C23F 11/18 (2006.01)
E21B 43/267 (2006.01)
(52) U.S. Cl.
USPC ...... 507/269; 507/271; 166/280.1; 166/280.2
(58) Field of Classification Search
USPC ................ 507/269, 271; 166/280.1, 280.2
See application file for complete search history.

(56) References Cited

U.S. PATENT DOCUMENTS

| 4,068,718 | A | | 1/1978 | Cooke, Jr. et al. |
| 4,427,068 | A | | 1/1984 | Fitzgibbon |
| 4,522,731 | A | | 6/1985 | Lunghofer |
| 4,668,645 | A | | 5/1987 | Khaund |
| 4,838,351 | A | | 6/1989 | Jennings, Jr. |
| 4,892,147 | A | | 1/1990 | Jennings, Jr. |
| 4,923,714 | A | * | 5/1990 | Gibb et al. .................... 427/221 |
| 4,948,766 | A | * | 8/1990 | Talmy et al. .................. 501/128 |
| 2002/0048676 | A1 | * | 4/2002 | McDaniel et al. ............ 428/404 |
| 2005/0242455 | A1 | * | 11/2005 | Toda et al. ...................... 264/44 |
| 2006/0081371 | A1 | * | 4/2006 | Duenckel et al. .......... 166/280.2 |

FOREIGN PATENT DOCUMENTS

| EP | 0112350 | 7/1984 |
| EP | 0112360 | 10/1986 |
| EP | 0168479 | 4/1989 |
| RU | 2098618 | 12/1997 |
| RU | 2203248 | 4/2003 |
| WO | 2006032008 A2 | 3/2006 |

OTHER PUBLICATIONS

Office Action for the equivalent Canadian patent application No. 2673935 issued on Jan. 11, 2013.

* cited by examiner

Primary Examiner — Aiqun Li
(74) Attorney, Agent, or Firm — Jeremy D. Tillman; Rachel Greene; Tim Curington

(57) ABSTRACT

The invention relates to the area of oil and gas production (especially, to the production in which the propping technique is used for the stimulation of a well) and can be used in the development of a composition and a method of production of propping agents (proppant), as well as a method of application of these propping agents. A new type of proppant, proppant production method and use of the proppant are based on allowing the production of proppant having an apparent density of 2.5 to 4.0 g/cm$^3$, as well as a high mechanical strength and a high chemical durability. A proppant contains granules made of the sintered feedstock, wherein the charge mixture containing at least one of the following materials—silicon carbide, boron carbide, titanium carbide, silicon nitride, titanium nitride, boron nitride, silicon oxynitrides, SIALON-type compounds, was used as the feedstock.

15 Claims, No Drawings

PROPPANT, PROPPANT PRODUCTION METHOD AND USE OF PROPPANT

This application claims the benefit of PCT/RU2007/000672, filed on Nov. 30, 2007, which is incorporated herein by reference in its entirety. The invention relates to the area of oil and gas production (especially, to the production in which the propping technique is used for the stimulation of a well) and can be used in the development of a composition and a method of production of propping agents (proppant), as well as a method of application of these propping agents.

BACKGROUND

The statements in this section merely provide background information related to the present disclosure and may not constitute prior art.

A method of intensification of oil or gas production by means of hydraulic fracturing of oil or gas-bearing formations has been known since 1940. Since then, a lot of solid fillers (proppant) have been proposed to be used for fixing the fractures produced. For this purpose, it was proposed to use sand, nutshells, aluminum and its alloys, wooden chips, crushed coke, crushed coal, mullite, glass balls, zirconium dioxide, silicon nitride and silicon carbide. Among the above-mentioned substances proposed as proppant, sand has had the widest practical use. However, sand is a low-strength material and it is difficult to use sand at the oil and gas occurrence depths where pressures exceed 34.5 MPa, because of the destruction of the sand. In view of this, medium-strength and high-strength proppant made of sintered bauxites were proposed to be used at great oil and gas occurrence depths.

Thus, there are known methods for producing propping agents from sintered bauxites containing up to 85-88 wt % of $Al_2O_3$ (U.S. Pat. No. 4,068,718, 1978; EP, Patent 0112360, 1984). A proppant made of sintered bauxite is a high-strength material. However, the cost of this proppant is much higher than that of the sand which is still widely used due to its low cost, in spite of its disadvantages. Besides, the density of proppant made of sintered bauxites exceeds 3 $g/cm^3$.

Less expensive clay materials and minerals were proposed to be used as the feedstock, so as to reduce the cost and the density of proppant while maintaining their strength properties.

Thus, there is a known proppant and its production method (EP, Patent 0168479, 1989) which involves the production of particles from minerals and the saturation of the surface of spheres with $Al_2O_3$. The proppant produced by this method contains 50 to 97 wt % of the mineral and 3 to 50 wt % of $Al_2O_3$. The minerals are selected from the group containing nepheline syenite, basalt, feldspar, shale, argillite, pyroxene and their mixtures. The proposed proppant has a lower cost, lower sintering temperature and lower gravity as compared with the proppant made of sintered bauxite. However, the cost of this proppant is still much higher than that of the proppant made of sand, as the feedstock (i.e. the minerals and $Al_2O_3$ used in the proppant production) is still rather expensive.

There is a known proppant (U.S. Pat. No. 4,522,731, 1985) which was proposed to be produced from alumina ore containing over 5 wt % of gibbsite (Eufaula, Ala.). According to the applicant, this proppant has a lower density as compared with the sintered bauxite, and has a mechanical strength which is capable of withstanding pressures up to 70 MPa and higher pressures. The proppant particles may include strengthening additives selected from the group containing nepheline syenite, fused bauxite, wollastonite, talc and fluorspar which can be added, in the amount up to 5 wt %, to the alumina ore during the production of spherical particles. However, according to the known patent, the proppant particles are sintered in a fluidized bed, which is not always economically feasible.

There is a known propping agent (U.S. Pat. No. 4,668,645, 1987) produced from inexpensive bauxite clay from Arkansas. It was established that it was possible to produce the end product (proppant) from the feedstock containing 16 to 19 wt % of silica and less than 0.35 wt % of oxides of alkali metals and alkali-earth metals, and that this proppant would meet the requirements imposed on medium-strength propping agents. According to the method described in the patent, the feedstock containing 70 to 80 wt % of aluminum oxide is calcined at a temperature of 1,000° C. until water has been completely removed. Then, it is reduced to powder with a degree of fineness below 10 microns, formed into spherical granules in an intense mixer and sintered at a temperature of 1,400 to 1,500° C. until the calcined material has converted into mullite and corundum. However, the use of the feedstock having a low content of oxides of alkali metals and alkali-earth metals and a relatively high content of aluminum oxide in this method limits considerably the sources of raw materials for the propping agent production.

There is a known proppant (U.S. Pat. No. 4,427,068, 1984) which was proposed to be produced from one or more clays, with additions of bauxites, alumina oxides or their mixtures. The sintered spherical granules of the end product have an $Al_2O_3/SiO_2$ ratio varying from 9:1 to 1:1 and a density below 3.4 $g/cm^3$. In this method, diaspore, refractory and flint clays were used and their content in the initial mixture of primary materials was at least 40 wt %. In accordance with the invention under this patent, powdered annealed clay and $Al_2O_3$ (or bauxite and their mixtures) were mixed together and granulated in an intense mixture, and the resultant granules were sintered at a temperature of 1,500° C. after drying. This proppant production method does not impose any strict limitation on the feedstock composition. However, when using the above clays, it is necessary to add up to 40 wt % of expensive bauxite to these clays, which increases considerably the cost of the feedstock and, consequently, the cost of the end product.

SUMMARY OF INVENTION

In one aspect, disclosed is a proppant containing granules made of the sintered feedstock, where the charge mixture containing at least one of the following materials used as the feedstock silicon carbide, boron carbide, titanium carbide, silicon nitride, titanium nitride, boron nitride, silicon oxynitrides, and SIALON-type compounds.

In another aspect, a proppant production method is disclosed which involves the preliminary crushing and mixing of the initial components, with subsequent granulation, drying and screening of these components into target fractions, wherein at least one of the following materials is used as the initial component: silicon carbide, boron carbide, titanium carbide, silicon nitride, titanium nitride, boron nitride, silicon oxynitrides, and SIALON-type compounds.

DETAILED DESCRIPTION

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The technical task which is solved by the technical solution developed consists in the development of a new type of proppant.

The technical result obtained by the implementation of the technical solution developed consists in allowing the production of proppant having an apparent density of 2.5 to 4.0 g/cm$^3$, as well as a high mechanical strength and a high chemical durability.

In order to determine the initial technical result, it was proposed to use the proppant which is produced from the initial mixture containing at least one of the following materials: silicon carbide, boron carbide, titanium carbide, silicon nitride, titanium nitride, boron nitride, silicon oxynitrides, SIALON-type compounds (i.e. the compounds the composition of which contains Si—Al—O—N elements, giving the name to these compounds). Moreover, the initial mixture may additionally contain up to 95 wt % of at least one of the following components: natural unfired aluminum hydrates, bauxites, nepheline syenites, clays, kaolines, pyrophyllites, disthene-sillimanite concentrates, andalusite, sillimanite, kyanite, feldspars, pegmatites, pearlite, vermiculite and clay shales; as well as aluminum hydrates, bauxites, nepheline syenites, clays, pyrophyllites, disthene-sillimanite concentrates, andalusite, sillimanite, kyanite, feldspars, pegmatites, pearlite, vermiculite and clay shales which have been fired to achieve a full or partial removal of chemically bound water; commercial alumina consisting of a mixture of transitional metastable forms of aluminum oxide and corundum oxide; blast-furnace slags; tailings and wastes from the nonferrous metals industry; bauxite slurry; kaoline cleaning rejects; scrap and wastes resulting from stone and ceramics sawing and processing; dioxides of silicone, magnesium, calcium, zinc, titanium, zirconium, iron, zinc, manganese and stannum, as well as zirconium silicate. The limitation imposed on the composition of the charge mixture consists in the requirement that the resultant proppant must have the apparent density value set by the operation conditions of the well.

The distinctive feature of the proposed proppant composition is that such non-oxide components as carbides, nitrides, borides and silicides of different elements are used as the initial raw components in addition to the commonly used bauxites and clays having different compositions. With the technical solution developed, it is possible to produce proppants having an apparent density of 2.5 to 4.0 g/cm$^3$, as well as a high mechanical strength and a high chemical durability.

The proppant can be manufactured as follows.

At least one initial non-oxide component and, if necessary, at least one of the initial oxide components are crushed until 90 to 100% of these products have passed through a 325-mesh screen. If necessary, surfactants (carboxymethyl cellulose, polyvinyl alcohol, etc.) are added to the initial materials. The components can be crushed both separately and jointly. The initial components are partially mixed together either in mills (unless the joint grinding method was used prior to this) or directly in a granulator. If necessary, a temporary process binder is added during the mixing process in the amount required for the development of nuclei of spherical particles and for the subsequent growth of these particles to required size. Usually, the amount of the temporary process binder varies from 5 to 25 wt %, and the total mixing and granulation time varies from 1 to 30 minutes. It is possible to use water, aqueous and organic solutions of polymers, latexes, microwaxes and paraffins as the binder. After the end of the nuclei development in the mixture previously placed into the granulator, up to 15 wt % of the initial crushed mixture are added to the granulator and then mixed for up to 5 minutes. The granules prepared by this method are dried and screened to the size that allows the compensation of the shrinkage resulting from the firing process. The granules which fail to meet the size requirements can be recycled. In case that organic temporary process binders were used during the mixing and granulation process, it is possible to use a preliminary firing stage to burn them out. The dried and sized granules are fired at temperatures and within exposure periods required for the achievement of an apparent density of below 4 g/cm$^3$. Additional sizing is possible after the firing stage.

Although the procedure of the use of the proposed proppant is similar to the standard procedure, but it allows the production of a strong proppant which can be used in the wells having collapsing stresses up to 20,000 psi.

The technical solution developed will be further considered, using examples of implementation.

1. The initial silicon carbide and the heat-treated bauxite ore were separately crushed to pass through a 325-mesh screen and mixed together at a ratio of 60/40 wt %. Then, about 4 kilograms of the resultant mixture were placed in an Eirich-type granulator (R02). The mixing process was started at a blade agitator rotation speed allowing the nucleation in the mixture. Additionally, 600 grams of a 3% aqueous solution of carboxymethyl cellulose were added to the said material. The period of mixing at the above speed lasted for 4 minutes. Then, the rotation speed was changed, and 200 grams of the initial mixture of crushed silicon carbide and heat-treated bauxite ore were put into the granulator. The period of additional mixing at a speed allowing the development of granules of desired size (0.15 to 5.0 mm) lasted for 2 minutes. The granules prepared by this method were dried and screened until over 90% of them had fallen within the range of −16 mesh/+30 mesh screens. The firing process was carried out at a temperature of 1,300 to 1,500° C. After the material had been fired, its apparent density was equal to 3.52 g/cm$^3$. The best strength values were observed at a temperature of 1,450° C., and the percentage of destruction determined in accordance with API recommended Practice 60 was equal to 3 wt % at a pressure of 10,000 psi (69 MPa).

2. About 3 kilograms of the mixture containing silicon nitride, clay and manganese oxide at a ratio of 55/40/5 wt % (with over 95% of particles being below 325 mesh in size) were placed into an R02 mixer manufactured by Eirich. The mixing process was started at a blade agitator rotation speed allowing the maximum nucleation of granules. Additionally, 400 grams of a 1% aqueous solution of polyvinyl alcohol were added to the said material. The period of mixing at the above speed lasted for 6 minutes. Then, the rotation speed was changed so as to promote the maximum increase in the granule size, and 200 grams of the initial mixture of silicon nitride, clay and manganese oxide were put into the granulator. The period of mixing at this speed lasted for 2 minutes. The granules prepared by this method were dried and screened until over 90% of them had fallen within the range of −16 mesh/+30 mesh screens. The firing process was carried out at a temperature of 1,300 to 1,500° C. After the material had been fired, its apparent density was equal to 3.2 g/cm$^3$. The best strength values were observed at a temperature of 1,350° C., and the percentage of destruction determined in accordance with API recommended Practice 60 was equal to 2.5 wt % at a pressure of 10,000 psi (69 MPa).

3. About 3 kilograms of the mixture containing silicon carbide, heat-treated bauxite ore and magnesium oxide at a ratio of 55/40/5 wt % (with over 98% of particles being below 325 mesh in size) were placed into an R02 mixer manufactured by Eirich. The mixing process was started at a blade agitator rotation speed allowing the maximum nucleation of granules. Then, 400 grams of a paraffin binder were added to the said material. The period of mixing at the above speed lasted for 6 minutes. Then, the rotation speed was changed so as to promote the maximum growth of the granules, and 200 grams of the initial mixture of silicon carbide, heat-treated bauxite ore and magnesium oxide were put into the granulator. The period of mixing at this speed lasted for 1.5 minutes. The granules prepared by this method were dried and screened until over 90% of them had fallen within the range of −16 mesh/+30 mesh screens. The preliminary binder burning-out process was carried out at a temperature of 600 to 1,000° C. The firing process was carried out at a temperature of 1,300 to 1,500° C. After the material had been fired, its apparent density was equal to 3.4 g/cm$^3$. The best strength values were observed at a temperature of 1,430° C., and the percentage of destruction determined in accordance with API recommended Practice 60 was equal to 2.5 wt % at a pressure of 15,000 psi (69 MPa).

The use of the proppant manufactured by a similar method allowed the performance of hydraulic fracturing in the wells having high values of collapsing stresses (up to 20,000 psi), where the chemical durability of the proppant was also important due to an acid pH reaction of the filterable fluid.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A proppant comprising
  granules made of sintered feedstock, wherein a charge mixture containing
    40 - 95 wt % of bauxites; and
    at least one of the following materials: silicon carbide, titanium carbide, silicon nitride, titanium nitride, silicon oxynitrides, and SIALON-type compounds, comprises the feedstock,
    wherein the charge mixture contains less than 10 wt % of alumina.

2. The proppant of claim 1 wherein the charge mixture additionally contains at least one of the following materials: natural unfired aluminum hydrates, nepheline syenites, clays, kaolines, pyrophyllites, disthene-sillimanite concentrates, andalusite, sillimanite, kyanite, feldspars, pegmatites, pearlite, vermiculite and clay shales; commercial alumina consisting of a mixture of transitional metastable forms of aluminum oxide and corundum oxide; blast-furnace slags; tailings and wastes from the nonferrous metals industry; bauxite slurry; kaoline cleaning rejects; scrap and wastes resulting from stone and ceramics sawing and processing; dioxides of silicone, magnesium, calcium, zinc, titanium, zirconium, iron, zinc, manganese and stannum, as well as zirconium silicate.

3. The proppant of claim 1 further comprising an organic temporary process binder.

4. The proppant of claim 3 wherein the organic temporary process binders are burnt out in a preliminary firing stage.

5. The proppant of claim 1 wherein the granules are dried and sized, and fired at temperatures and within exposure periods required for the achievement of an apparent density of below about 4 g/cm$^3$.

6. The proppant of claim 1 wherein the granules which fail to meet the size requirements are recycled.

7. The proppant of claim 1 which has a collapsing stress up to 20,000 psi.

8. A method for producing proppant comprising:
  a) preliminary crushing and mixing of initial components; and,
  b) subsequent granulation, drying and screening of the initial components into target fractions;
    wherein a mixture containing
      40-95 wt % of bauxites and
      at least one of the following materials, silicon carbide, titanium carbide, silicon nitride, titanium nitride, silicon oxynitrides, SIALON-type compounds, comprises the initial components,
    wherein the charge mixture contains less than 10 wt % of alumina.

9. A method of claim 8 wherein the initial components are admixed with at least one of natural unfired aluminum hydrates, nepheline syenites, clays, kaolines, pyrophyllites, disthene-sillimanite concentrates, andalusite, sillimanite, kyanite, feldspars, pegmatites, pearlite, vermiculite and clay shales; commercial alumina consisting of a mixture of transitional metastable forms of aluminum oxide and corundum oxide; blast-furnace slags; tailings and wastes from the nonferrous metals industry; bauxite slurry; kaoline cleaning rejects; scrap and wastes resulting from stone and ceramics sawing and processing; dioxides of silicone, magnesium, calcium, zinc, titanium, zirconium, iron, zinc, manganese and stannum, and zirconium silicate.

10. The method of claim 8 wherein the initial components comprise an organic temporary process binder.

11. The method of claim 10 wherein the organic temporary process binders are burnt out in a preliminary firing stage.

12. The method of claim 8 wherein the proppant comprises granules which are dried and sized, and fired at temperatures and within exposure periods required for the achievement of an apparent density of below about 4 g/cm$^3$.

13. The method of claim 8 wherein the proppant comprises granules, and wherein granules which fail to meet the size requirements are recycled.

14. The method of claim 8 wherein the proppant has collapsing stresses up to 20,000 psi.

15. The method of claim 8 wherein granules are dried and screened to a size allowing compensation of shrinkage resulting from the firing process.

* * * * *